June 25, 1963 D. R. S. McCOLL 3,095,543

MEANS FOR MODULATING HIGH FREQUENCY GENERATORS

Filed June 22, 1959 2 Sheets-Sheet 1

INVENTOR
DAVID R. S. Mc COLL
BY H. Vincent Harsha
ATTORNEY

MEANS FOR MODULATING HIGH FREQUENCY GENERATORS

Filed June 22, 1959 2 Sheets-Sheet 2

INVENTOR
DAVID R. S. Mc COLL
BY H. Vincent Harsha
ATTORNEY

United States Patent Office 3,095,543

Patented June 25, 1963

3,095,543
MEANS FOR MODULATING HIGH FREQUENCY GENERATORS

David R. S. McColl, Sudbury, Mass., assignor to Raytheon Company, Lexington, Mass., a corporation of Delaware Filed June 22, 1959, Ser. No. 822,043
11 Claims. (Cl. 332—51)

This invention relates to high frequency modulation and more particularly to modulation of a high frequency generator by varying the load on the output of the generator by means of a ferrite modulator or gyrator.

Heretofore, microwave modulation has usually been accomplished by electrically superimposing or associating modulation energy either directly with the microwave energy near its source or directly with the circuit parameters of the source itself.

Several methods of varying output frequency of high frequency generators such as, for example, generators of the magnetron type have been previously recognized and developed. All such methods depend upon the fundamental nature of the magnetron characteristics as determined from a Rieke diagram or magnetron performance curves. It is known to vary both magnetron frequency and amplitude by a change in the operating point usually called "pushing," or by variation of the resistive and reactive component of the load called "pulling." The first method or pushing is accomplished by effectively plate-modulating the magnetron; that is, by connecting a source of modulation voltage in series with the magnetron and the plate supply. This method is generally unsatisfactory for several reasons. For example, in any frequency modulation system it is generally desirable to operate in a region of high frequency modulation sensitivity, that is, deviation per unit modulation parameter should be high. The available dynamic range is normally large enough so that linear frequency modulation may be obtained for small deviations. Such operation in pushing has proved critical, however, because large variations in frequency modulation sensitivity occur for minor changes of the average modulation operating point. The available dynamic range of frequency deviation with respect to the requirements of some radar systems has also been found inadequate. It has also been found that if the frequency deviation is extended to the required limits excessive non-linearity and consequent errors result.

A disadvantage inherent in many devices based on the second method or the aforementioned principle of pulling is that the loading of the generator supplying the energy is altered upon modulation, so that frequency modulation and an undesired and substantial degree of amplitude modulation may occur. Many suggestions have been made to obviate this disadvantage. For example, one method of providing microwave modulation is by introducing means in the waveguide effective for this purpose. This approach is inefficient. In this case only that portion of the energy that passes the modulation means is left for further useful purposes. The energy which is allowed to pass through the modulation means is partially absorbed therein and partially reflected in the direction of the transmitter and the portion of the energy reflected in the direction of the transmitter changes the load on the transmitter.

The principal object of the present invention is to provide high frequency generator pulling through controlled variation of the load on the generator.

Another objective of the present invention is to provide a structurally simple device in which many disadvantages of known devices are obviated, at least in part.

Another objective of the present invention is to provide frequency and/or amplitude modulation of a high frequency generator by varying the load on the generator by means of a ferrite modulator or gyrator.

A more specific objective of the present invention is to provide frequency modulation of a microwave generator.

A further objective of the present invention is to provide frequency modulation of a magnetron in a linear manner over a considered frequency range under conditions of high power and without serious amplitude modulation.

Briefly, the modulation arrangement in accordance with the invention comprises a section of transmission line arranged to accommodate at a particular point by suitable coupling means a ferrite gyrator for varying the load imposed either directly or indirectly on the output of a high frequency generator such as a magnetron. Although the invention is particularly suited for modulating magnetrons of known and predictable characteristics it will be readily appreciated that it can be used with other generators and/or the various types of transmission lines. The gyrator employs a modulation coil surrounding an appropriate ferrite element coupled to the output of the high frequency generator. The gyrator is preferably located a specific distance from a reference point on the generator determined from the operating characteristics of the generator and the electrical length of the gyrator. Frequency and/or amplitude modulation is obtained by supplying a suitable A.C. or modulation signal to the modulation coil. Selection of the D.C. level of the modulating signal can be made to an appropriate level to secure either amplitude or frequency modulation or a combination of the two. The modulation signal can be a signal from a suitable source or feedback circuit to balance out or cancel undesirable signals such as noise and the like, or an A.C. signal for modulation or a combination of both.

The above-mentioned and other objects and features of the present invention will become more apparent upon consideration of the following discussion of an embodiment of the invention taken in conjunction with the accompanying drawings, wherein:

FIG. 1 shows by way of example and for purposes of illustration a Rieke diagram of a QK–259 magnetron wherein: $F_o$=10,125 mcs.; $E_p$=1,250 kv.; $I_p$=110 ma.; $E_f$=6.5 v.; and $I_f$=2.5 a.

Figure 1:
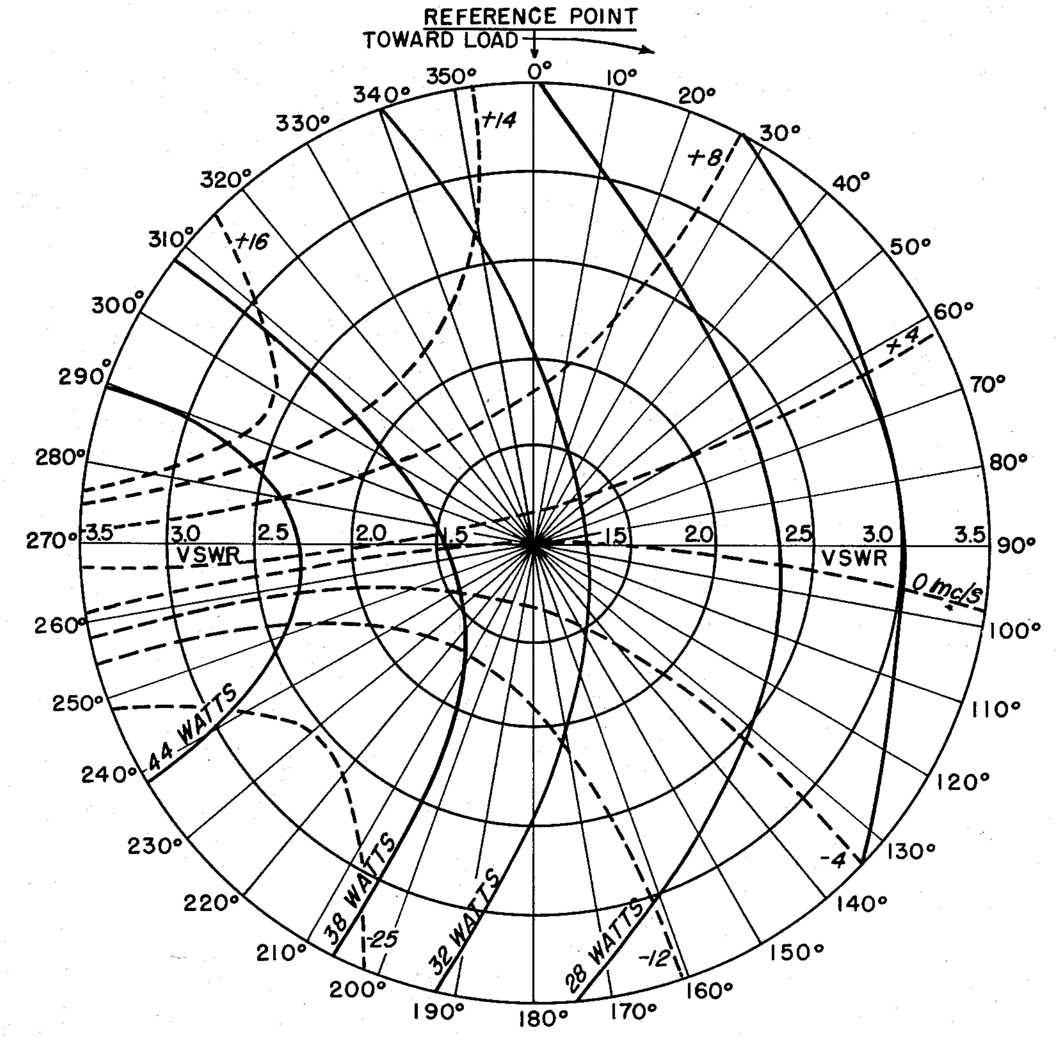
FIG. 1 is a Rieke diagram showing by way of example the operating characteristics or performance curves of a CW magnetron.

It may be seen from FIG. 1 that a change in standing wave ratios or of phase of load can be used to produce frequency modulation of a magnetron and that such a change can be represented by movement along a particular line on the diagram. The extent of the modulation obtained from a given change in SWR and/or phase will depend upon the amplitude and phase of the initial load presented to the magnetron. To obtain a high frequency modulation sensitivity it is necessary to operate near the sink region of the Rieke diagram, since the frequency contours are close together in this area. It is not advisable, however, to operate too close to the sink region because small phase changes will result in large jumps in frequency or in actual frequency instability. However, for a given requirement of frequency deviation an optimum phase of the load may be found to exist for high sensitivity compatible with stability.

The Rieke diagram shown in FIG. 1 illustrates the basic principle upon which the invention is based. Use of such a diagram for a specific magnetron the output of which is to be modulated, facilitates the determination of optimum distances and operating parameters described hereinafter.

Figure 2:
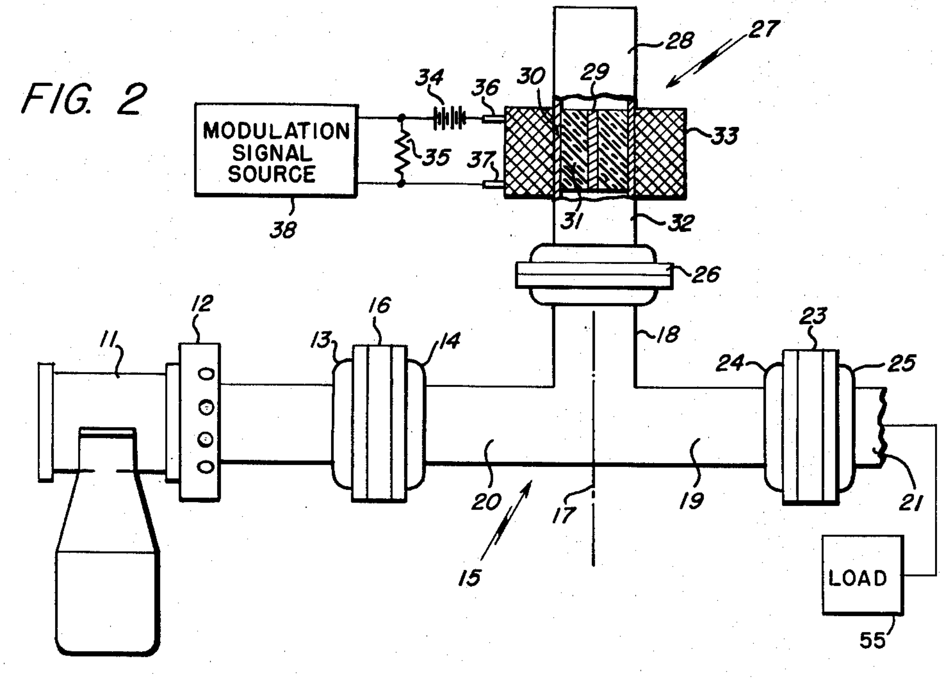
FIG. 2 is a schematic diagram of a preferred embodiment of the invention.

With reference now to FIG. 2 which shows by way of illustration a specific embodiment of the invention, the output circuit of a high frequency generator, shown as a magnetron 11, is provided with a magnetron coupler 12 for coupling the output energy of the magnetron to a suitable hollow waveguide. Flange 13 of the magnetron coupler 12 and flange 14 of a T connector 15 are adapted to receive a shim 16 for adjustment or variation of the distance from a reference point on the magnetron to the axis 17 of arm 18. Arm 19, colinear with arm 20 of the T 15 is coupled to a transmission line 21 terminated in a suitable load 55 such as an antenna. A shim 23 similar in configuration to shim 16, is disposed between flanges 24—25. Arm 18, disposed at right angles to arms 19—20, is provided with a flange 26 for connection to a ferrite gyrator 27 of conventional construction and terminated by a shortening stub 28. Disposed between flange 26 and the shorting stub 28 is a conventional slug of suitable ferrite material 29 supported by dielectric material 31 carried in the waveguide portion 30 and surrounded by a modulation coil 33. Waveguide portion 32 couples waveguide portion 30 to flange 26. The gyrator 27 is of conventional structure well known in the art wherein the ferrite element 29 is operable under the influence of a magnetic field supplied by coil 33 to rotate incident electrical energy through a predetermined angle which is a function of the ferrite size and the magnitude of the magnetic field. The mode and principle of operation of ferrite gyrators are by now well known in the art and for this reason it is not believed necessary to include herein a more thorough discussion of the operation of such a device. A source of D.C. bias, shown as a battery 34 is connected in series with an impedance, shown as a resistor 35 between the terminals 36—37 of coil 33. The modulation signal, from a modulation signal source 38, is impressed across the resistor 35. The modulation signal applied to coil 33 as pointed out hereinbefore can be D.C. for balancing purposes, or an A.C. signal which is usually the case, or a combination of both.

In assembling the modulator, the proper distance from the reference point on the magnetron to the center point or axis 17 of the T connector 15 and the proper total length for the shorting stub 28 and gyrator 27 are determined, preferably by means of a Rieke diagram for the magnetron being used, the type of operation desired and the desired frequency of operation. Application of an A.C. modulation signal to coil 33 controls phase and, hence, will control modulation of the magnetron in accordance with the invention. For frequency modulation the modulation signal without substantial D.C. bias may be supplied to coil 33, the proper distances having previously been determined. For amplitude modulation the modulation signal is adjusted to the proper value as determined, for example, by experiment and from the Rieke diagram to prevent or minimize frequency modulation. Upon adjustment of the modulation signal, variation thereof about this level effectively varies the electrical length from the magnetron to the T connector as seen by the magnetron output signal which results in amplitude modulation of the output energy from the magnetron. It will be understood that although the electrical length referred to hereinbefore may be mechanically varied by physical adjustment of the shorting stub and/or the arms of the T, physical adjustment is not practically satisfactory because it is subject to all the limitations inherent in a mechanical system.

Figure 3:
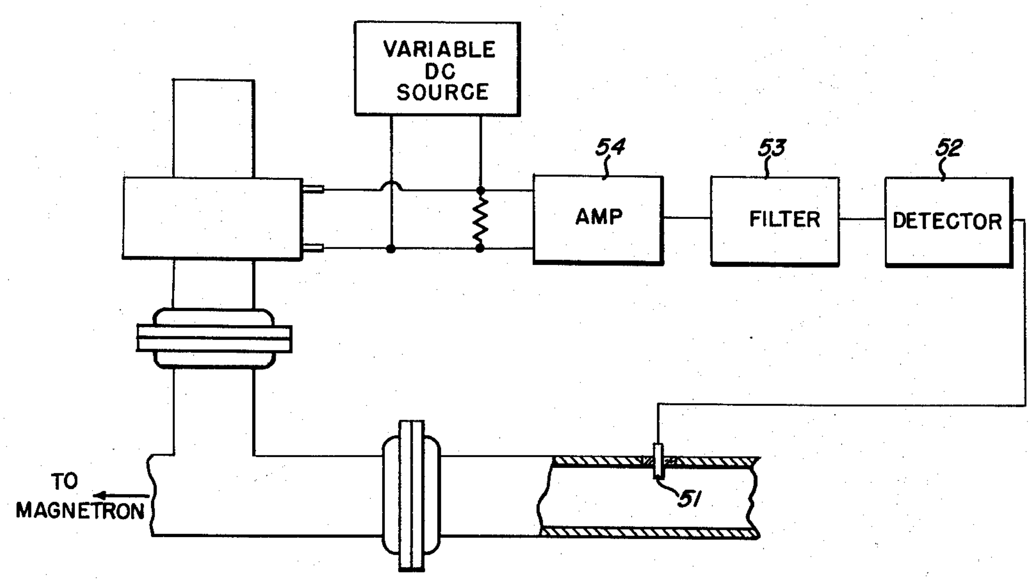
FIG. 3 is a schematic drawing of a modification of the invention.

FIG. 3 shows a modification of the invention for balancing purposes, such as, for example, to cancel one form of noise. A probe 51 mounted in the transmission line is connected to a detector 52 the output of which may be supplied through a filter 53 to an amplifier 54. The output signal of the amplifier 54, which is proportional to noise, is supplied to coil 33 in the manner hereinbefore described. Unwanted noise can thereby be cancelled. If desired or necessary, phase shifting means may be included in the feedback circuit to coil 33 for maximum or adjustable noise cancellation.

Frequency deviation may be compensated or corrected by the simple and well-known expedient of coupling a cavity (not shown) into the transmission line and converting the FM signal so obtained to AM. The AM signal may then be supplied to the coil 33 in the manner hereinbefore described.

It will be apparent to those skilled in the art that couplers of a type other than that of a T may be used and that continuously adjustable means may be utilized for connection of the coupler between the high frequency generator and transmission line. It will be further apparent that various types of high frequency generators other than those of the magnetron type may be used with any suitable type of transmission line and that devices equivalent in operation and function to that of the gyrator 27 may be used. Further, although less satisfactory, the shorting stub may be omitted and an open loop through the gyrator and back to the transmission line may be used. In this case, the proper length of the loop and the point of reentry into the transmission line is difficult to obtain.

The present invention provides frequency (or amplitude) modulation of a magnetron in a linear manner over a considerable frequency range and without serious unwanted amplitude (or frequency) modulation. Magnetrons of the type referred to may be deviated satisfactorily over peak-to-peak swings of 4 megacycles and peak-to-peak swings of 10 megacycles may be obtained if desired. Further, very little variation in modulation performance of a given tube over a normal operating range of anode voltage and current is obtained. This contrasts favorably with a normal "pushing" characteristic discussed hereinbefore where it is difficult to keep deviation sensitivity constant.

What is claimed is:

1. A high frequency modulator comprising: a high frequency generator; a gyrator coupled at one end to a transmission line; means at the other end of said gyrator for reflecting energy received by said gyrator; means for connecting said high frequency generator to said transmission line; and means for modulating the generator in a controlled manner by varying the phase shift of said gyrator in accordance with a modulation signal.

2. A high frequency modulator comprising: a high frequency generator; a gyrator; a transmission line positioned to receive the output signal of said high frequency generator; means for coupling one end of said gyrator to said transmission line whereby a portion of said output signal is coupled to said gyrator, said gyrator being located a predetermined distance from said generator; means at the other end of said gyrator for reflecting energy received by said gyrator; and means for modulating the generator in a controlled manner by varying the phase shift of said gyrator in accordance with a modulation signal.

3. A high frequency modulator comprising: a high frequency generator; a transmission line positioned to propagate the output signal of said high frequency generator; a gyrator; means for coupling one end of said gyrator to said transmission line whereby a portion of said output signal is coupled to said gyrator, said gyrator being located a predetermined distance from said generator; means at the other end of said gyrator for reflecting energy received by said gyrator; and means for modulating the generator in a controlled manner by applying a modulation signal to said gyrator for varying the phase of the load on said generator in accordance with said modulation signal.

4. A high frequency modulator comprising: a high frequency generator; a transmission line positioned to propagate the output signal of said high frequency generator; a gyrator having one end terminated by a shorting stub; means for coupling said gyrator to said transmission line whereby a portion of said output signal is coupled to said gyrator, said gyrator and said shorting stub having a predetermined length and located a predetermined distance from said generator; said shorting stub reflecting energy received from said gyrator; and means for modulating the generator in a controlled manner by applying a modulation signal to said gyrator for varying the phase of the load presented to said generator in accordance with said modulation signal.

5. Apparatus for varying the output characteristics of a high frequency generator comprising: a high frequency generator; a transmission line for receiving the output signal of said generator; a gyrator including a ferrite element and a coil surrounding said ferrite element; means for coupling a portion of said output signal to said gyrator reflecting means connected to one end of said gyrator collecting energy received by said gyrator, said gyrator being located a predetermined distance from said generator; and means for modulating the generator in a controlled manner by supplying a modulation signal to said coil.

6. Apparatus for varying the output characteristics of a high frequency generator comprising: a high frequency generator; a transmission line for receiving and propagating the output signal of said generator; a gyrator including a ferrite element and a coil surrounding said ferrite element; means for coupling a portion of said output signal to one end of said gyrator, said gyrator being located a predetermined distance from said generator; means terminating the other end of said gyrator for reflecting energy received by said gyrator; and means for modulating the generator in a controlled manner by supplying a modulation signal to said coil.

7. A high frequency modulator for varying the output characteristics of a high frequency generator comprising: a high frequency generator; a transmission line for receiving and propagating the output signal of said generator; a reciprocal gyrator including a ferrite element and a coil surrounding said ferrite element; means for coupling one end of said gyrator to said transmission line, said gyrator being located along said transmission line a predetermined distance from said generator; means terminating the other end of said gyrator for reflecting energy received by said gyrator, said reflecting means, gyrator and coupling means comprising a waveguide of predetermined length; and means for modulating the generator in a controlled manner by supplying a modulation signal to said coil for varying the phase shift through said gyrator.

8. A high frequency modulator for varying the output characteristics of a magnetron comprising: a magnetron, a transmission line connected to the output circuit of said magnetron for receiving and propagating wave energy; a reciprocal gyrator including a ferrite element and a coil surrounding said ferrite element; means for coupling a portion of said wave energy propagated by said transmission line to one end of said gyrator, said gyrator being located along said transmission line a predetermined distance from said magnetron; means for providing a short circuit to wave energy at the other end of said gyrator whereby said short circuiting means, gyrator and coupling means comprise a waveguide of predetermined length and wave energy received by said gyrator from said transmission line is reflected back to said transmission line; and means for modulating said magnetron in accordance with said modulation signal by supplying a modulation signal to said coil for varying the phase shift through said gyrator.

9. Apparatus for varying the output characteristics of a high frequency generator comprising: a high frequency generator; a transmission line connected to the output circuit of said generator for receiving and propagating the output signal of said generator; a reciprocal gyrator including a ferrite element and a coil surrounding said ferrite element; means for coupling one end of said gyrator to said transmission line, said gyrator being located along said transmission line a predetermined distance from said generator; means terminating the other end of said gyrator for reflecting energy received by said gyrator; said reflecting means, gyrator and coupling means comprising a waveguide of predetermined length; means for supplying a bias voltage to said coil; and means for modulating said generator in a controlled manner in accordance with a modulation signal by supplying a modulation signal to said coil for varying the phase shift through said gyrator.

10. In apparatus for providing modulated high frequency wave energy the combination comprising: a high frequency generator the output characteristics of which vary with the character of the load presented to the generator; said high frequency generator consisting of a magnetron; a transmission line connected to the output circuit of said magnetron for receiving and propagating wave energy; a reciprocal gyrator including a ferrite element and a coil surrounding said ferrite element; means for coupling a portion of said wave energy propagated by said transmission line to one end of said gyrator, said gyrator being located along said transmission line a predetermined distance from said magnetron; means for providing a short circuit to wave energy at the other end of said gyrator whereby said short circuiting means, gyrator and coupling means comprise a waveguide of predetermined length and wave energy received by said gyrator from said transmission line is reflected back to said transmission line; and means for modulating said magnetron in accordance with a modulation signal by supplying a modulation signal to said coil for varying the phase shift through said gyrator.

11. A system for providing modulation of a high frequency source of energy comprising a high frequency source of energy, a gyrator positioned to receive and rotate a portion of linearly polarized high frequency energy from said high frequency source, reflecting means for reflecting said rotated portion of said linearly polarized high frequency energy through said gyrator, a load connected to said gyrator, means for producing modulated voltage in said gyrator, and means between said load and said gyrator positioned to direct a portion of said reflected high frequency energy back to said high frequency source to shift the frequency of said high frequency source in response to amplitude variations of said modulated voltage.

References Cited in the file of this patent

UNITED STATES PATENTS

| | | |
|---|---|---|
| 2,645,758 | De Lindt | July 14, 1953 |
| 2,714,191 | Cayzac | July 26, 1955 |
| 2,748,353 | Hogan | May 29, 1956 |
| 2,769,960 | Mumford | Nov. 6, 1956 |
| 2,857,574 | Anderson | Oct. 21, 1958 |
| 2,894,209 | Chodorow et al. | July 7, 1959 |
| 2,980,870 | Zaleski | Apr. 18, 1961 |

OTHER REFERENCES

Hogan: "The Microwave Gyrator," Tele-Tech and Electronic Industries, pp. 64–66 and 137–140; November 1959.